United States Patent
Liu et al.

(10) Patent No.: US 11,258,311 B2
(45) Date of Patent: *Feb. 22, 2022

(54) WIRELESS POWER SYSTEM WITH COUPLING-COEFFICIENT-BASED COIL SELECTION

(71) Applicant: Apple Inc., Cupertino, CA (US)

(72) Inventors: Nan Liu, Sunnyvale, CA (US); Dmitry Berdnikov, San Jose, CA (US); Weihong Qiu, San Ramon, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/909,904

(22) Filed: Jun. 23, 2020

(65) Prior Publication Data
US 2020/0321811 A1 Oct. 8, 2020

Related U.S. Application Data

(63) Continuation of application No. 15/880,214, filed on Jan. 25, 2018, now Pat. No. 10,734,847.
(Continued)

(51) Int. Cl.
*H02J 50/80* (2016.01)
*H02J 50/10* (2016.01)
*H02J 50/60* (2016.01)

(52) U.S. Cl.
CPC .............. *H02J 50/80* (2016.02); *H02J 50/10* (2016.02); *H02J 50/60* (2016.02)

(58) Field of Classification Search
CPC .. H02J 50/80; H02J 50/10; H02J 50/60; H02J 50/00
See application file for complete search history.

(56) References Cited

U.S. PATENT DOCUMENTS 9,209,627 B2 * 12/2015 Baarman ............... H02J 50/70
9,551,805 B2 * 1/2017 Singh .................... H02J 50/60
(Continued)

FOREIGN PATENT DOCUMENTS

CN 102035268 A 4/2011
CN 103248132 A 8/2013
(Continued)

OTHER PUBLICATIONS

Ahn et al., "Effect of Coupling Between Multiple Transmitters or Multiple Receivers on Wireless Power Transfer" IEEE Transactions on Industrial Electronics, vol. 60, No. 7, Jul. 2013, 12 pagers.

*Primary Examiner* — Rexford N Barnie
*Assistant Examiner* — Joseph N Inge
(74) *Attorney, Agent, or Firm* — Treyz Law Group, P.C.; Jason Tsai

(57) ABSTRACT

A wireless power system may have a wireless power transmitting device and a wireless power receiving device. The wireless power receiving device may have a receive coil that receives wireless power signals from the wireless power transmitting device and may have a rectifier that produces direct-current power from the received wireless power signals. The wireless power transmitting device may have an array of transmit coils. Each transmit coil has a respective magnetic coupling coefficient characterizing its magnetic coupling with the receive coil. The wireless power transmitting device may have control circuitry that uses the magnetic coupling coefficient values in selecting transmit coils to use in transmitting wireless power to the wireless power receiving device.

20 Claims, 5 Drawing Sheets

Related U.S. Application Data

(60) Provisional application No. 62/549,258, filed on Aug. 23, 2017.

(56) References Cited

U.S. PATENT DOCUMENTS

| | | | | |
|---|---|---|---|---|
| 9,806,555 B2* | 10/2017 | Li | ............................ | H02J 50/40 |
| 9,929,583 B2* | 3/2018 | Jeong | ..................... | H02J 7/0013 |
| 10,734,847 B2* | 8/2020 | Liu | ......................... | H02J 50/80 |
| 2010/0259217 A1* | 10/2010 | Baarman | ............... | H02J 7/0036 |
| | | | | 320/108 |
| 2013/0002034 A1* | 1/2013 | Onizuka | ................. | H02J 50/12 |
| | | | | 307/104 |
| 2013/0119773 A1* | 5/2013 | Davis | ...................... | H02J 50/12 |
| | | | | 307/104 |
| 2013/0241745 A1* | 9/2013 | Colvin, Jr. | ............ | A61B 5/0031 |
| | | | | 340/870.02 |
| 2014/0094116 A1* | 4/2014 | Walley | .................... | H02J 50/12 |
| | | | | 455/41.1 |
| 2014/0300196 A1* | 10/2014 | Bunsen | ................... | H02J 50/10 |
| | | | | 307/104 |
| 2015/0028691 A1* | 1/2015 | Yamauchi | .............. | B60L 53/126 |
| | | | | 307/104 |
| 2015/0048688 A1* | 2/2015 | Yamakawa | .......... | H02M 7/5387 |
| | | | | 307/104 |
| 2015/0214747 A1* | 7/2015 | Abe | ......................... | H02J 50/12 |
| | | | | 307/104 |
| 2015/0340881 A1* | 11/2015 | Nakano | .................... | H02J 7/025 |
| | | | | 307/104 |
| 2016/0079797 A1* | 3/2016 | Jeong | ....................... | H02J 7/025 |
| | | | | 320/108 |
| 2016/0156198 A1* | 6/2016 | Misawa | ................... | B60L 3/003 |
| | | | | 307/104 |
| 2017/0040846 A1* | 2/2017 | Sankar | ................. | H04B 5/0081 |
| 2017/0237296 A1* | 8/2017 | Keith | ...................... | H02J 7/045 |
| | | | | 307/104 |
| 2017/0305282 A1* | 10/2017 | Obayashi | ................ | H02J 50/12 |
| 2017/0338696 A1* | 11/2017 | Bae | ......................... | H02J 50/00 |
| 2017/0365403 A1* | 12/2017 | Stout, II | .................. | H01F 38/14 |
| 2018/0287434 A1* | 10/2018 | Ii | ............................. | H02J 50/10 |

FOREIGN PATENT DOCUMENTS

| | | |
|---|---|---|
| CN | 103715780 A | 4/2014 |
| CN | 105575235 A | 5/2016 |
| CN | 105790448 A | 7/2016 |
| CN | 105895330 A | 8/2016 |
| CN | 105914831 A | 8/2016 |
| CN | 106602741 A | 4/2017 |
| WO | 2015119456 A1 | 8/2015 |
| WO | 2015119458 A1 | 8/2015 |

* cited by examiner

US 11,258,311 B2

WIRELESS POWER SYSTEM WITH COUPLING-COEFFICIENT-BASED COIL SELECTION

This patent application claims is a continuation of U.S. patent application Ser. No. 15/880,214, filed Jan. 25, 2018, which claims the benefit of provisional patent application No. 62/549,258, filed on Aug. 23, 2017, each of which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device and a wireless power receiving device. The wireless power receiving device has a receive coil that receives wireless power signals from the wireless power transmitting device and has a rectifier that produces direct-current power from the received wireless power signals.

The wireless power transmitting device has an array of transmit coils. Each transmit coil has a respective magnetic coupling coefficient characterizing its magnetic coupling to the receive coil. The wireless power transmitting device has control circuitry that uses the magnetic coupling coefficient values in selecting which transmit coils to use in transmitting the wireless power signals to the wireless power receiving device.

The coupling coefficient values may be determined by the control circuitry based on rectifier output voltages in the power receiving device, information on a voltage input value to inverter circuitry in the wireless power transmitting device, information on voltages across capacitors coupled to the transmit coils, and, if desired, other information.

DETAILED DESCRIPTION

A wireless power system includes a wireless power transmitting device such as a wireless charging mat. The wireless power transmitting device wirelessly transmits power to a wireless power receiving device such as a wristwatch, cellular telephone, tablet computer, laptop computer, or other electronic equipment. The wireless power receiving device uses power from the wireless power transmitting device for powering the device and for charging an internal battery.

The wireless power transmitting device communicates with the wireless power receiving device and obtains information on the characteristics of the wireless power receiving device. The wireless power transmitting device uses information from the wireless power receiving device and measurements made in the wireless power transmitting device to determine a value of the magnetic coupling coefficient between each of multiple transmit coils in the wireless power transmitting device and a receive coil in the wireless power receiving device. Coil selection is then performed in the wireless power transmitting device based on the coupling coefficient measurements.

Figure 1:
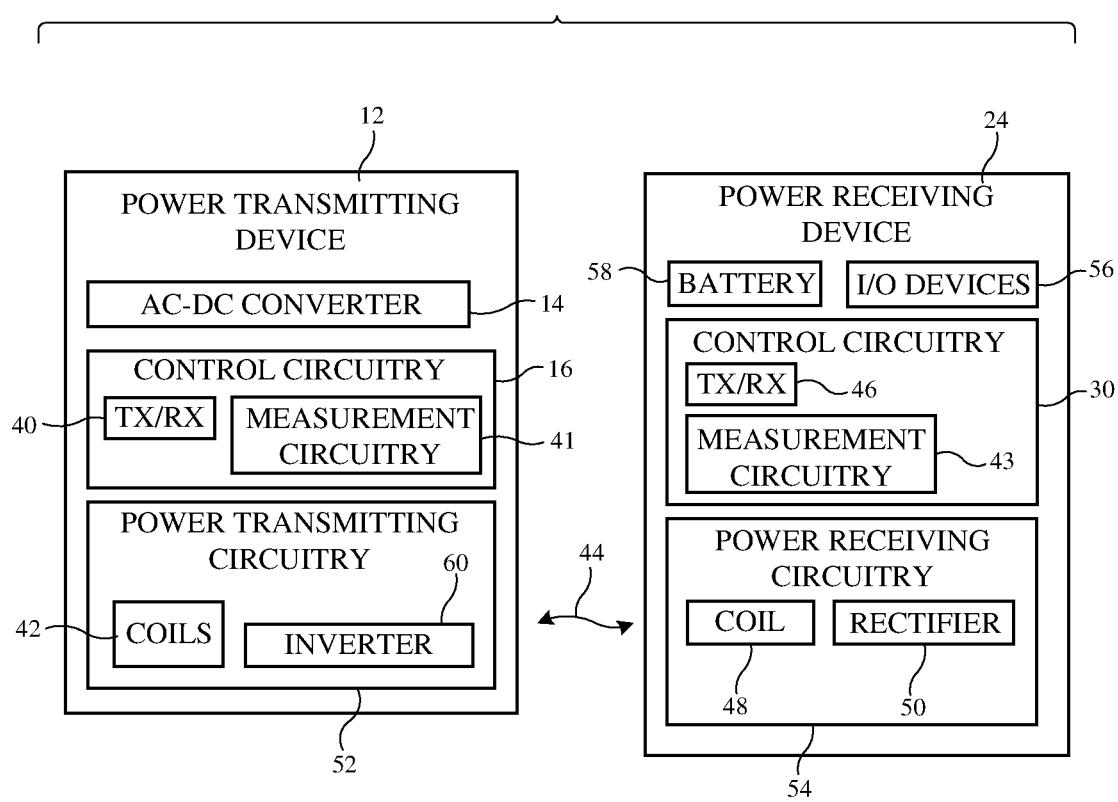
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable device, may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat).

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering a battery such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 can use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48.

In-band communications between device 24 and device 12 uses ASK modulation and demodulation techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12.

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies (to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
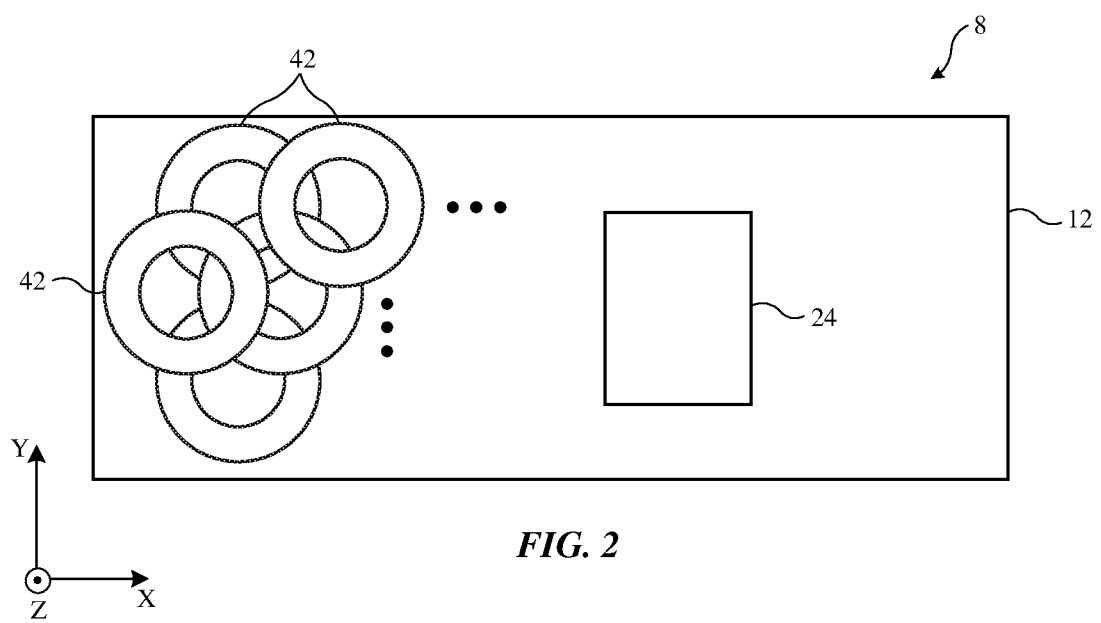
FIG. 2 is a top view of an illustrative wireless power transmitting device having a charging surface on which a wireless power receiving device has been placed in accordance with an embodiment.

A top view of an illustrative configuration for device 12 in which device 12 has an array of coils 42 is shown in FIG. 2. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not partially overlap each other. System 8 may be configured to accommodate the simultaneous charging of multiple devices 24. Illustrative operations involved in operating system 8 to provide power wirelessly to a single device 24 are described herein as an example.

A user of system 8 may place wireless power receiving devices such as device 24 of FIG. 2 on device 12 for charging. Magnetic coupling coefficient k represents the amount of magnetic coupling between transmitting and receiving coils in system 8. Wireless power transfer efficiency scales with k, so optimum charging (e.g., peak efficiency) may be obtained by evaluating the coupling coefficient k for each coil and choosing appropriate coil(s) to use in transmitting wireless power to device 24 based on the coupling coefficients.

Figure 3:
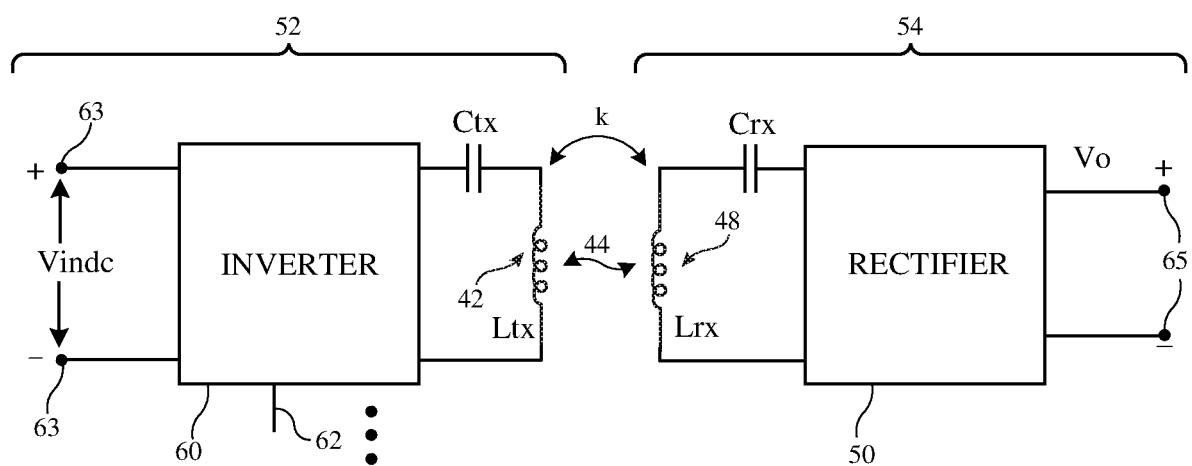
FIG. 3 is a circuit diagram of illustrative wireless power transmitting circuitry and illustrative wireless power receiving circuitry in accordance with an embodiment.

Illustrative circuitry of the type that may be used for forming power transmitting circuitry 52 and power receiving circuitry 54 of FIG. 1 is shown in FIG. 3. As shown in FIG. 3, power transmitting circuitry 52 may include drive circuitry (inverter circuitry) for supplying alternating-current drive signals to coils 42. With one illustrative configuration, the inverter circuitry includes multiple inverter circuits such as inverter 60 of FIG. 3 each of which is controlled by control circuitry 16 of device 12 and each of which is coupled to a respective one of coils 42. After coupling coefficients k have been determined for each coil 42, control circuitry 16 can switch appropriate coil(s) 42 into use by selecting corresponding inverters 60 to use in driving signals into the coils.

Each inverter 60 has metal-oxide-semiconductor transistors or other suitable transistors. These transistors are modulated by an AC control signal from control circuitry 16 (FIG. 1) that is received on control signal input 62. The AC control signal controls modulate the transistors so that direct-current power (input voltage Vindc across direct-current power supply input terminals 63) is converted into a corresponding AC drive signal applied to coil 42 (having a self-inductance of Ltx) via its associated capacitor Ctx. This produces electromagnetic signals 44 (magnetic fields), which are electromagnetically (magnetically) coupled into coil 48 in wireless power receiving device 54.

The degree of electromagnetic (magnetic) coupling between coils 42 and 48 is represented by magnetic coupling coefficient k. Signals 44 are received by coil 48 (having a self-inductance of Lrx). Coil 48 and capacitor Crx are connected to rectifier 50. During operation, the AC signals from coil 48 that are produced in response to received signals 44 are rectified by rectifier 50 to produce direct-current output power (e.g., direct-current rectifier output voltage Vo) across output terminals 65. Terminals 65 are connected to and provide power to the load of power receiving device 24 (e.g., battery 58 and other components in device 24 that are being powered by the direct-current power supplied from rectifier 50).

Figure 4:
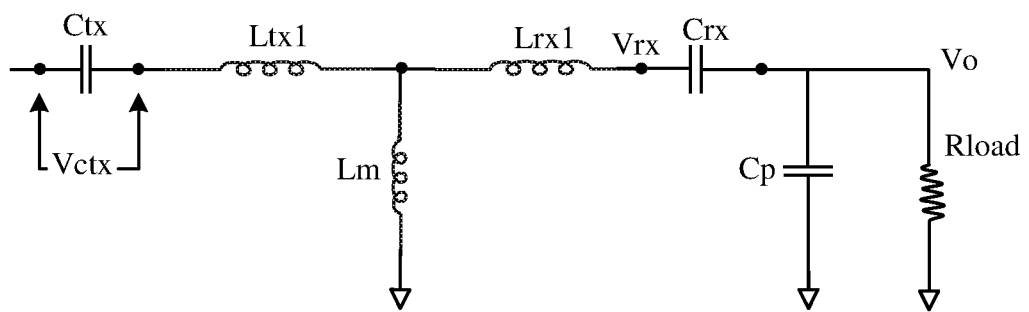
FIG. 4 is a circuit diagram of an equivalent circuit for the circuitry of FIG. 3 in accordance with an embodiment.

An equivalent circuit for the circuitry of FIG. 3 is shown in FIG. 4. Mutual inductance Lm results from the coupling between coils 42 and 48. Transmit coil leakage inductance Ltx1 is equal to Ltx−Lm. Receive coil leakage inductance Lrx1 is equal to Lrx−Lm. During operation, a peak-to-peak voltage Vctx is produced across capacitor Ctx. Voltage Vrx is present at the node between inductance Lrxl and capacitor Crx. Capacitance Cp and resistance Rload represent the capacitance associated with rectifier 50 and the equivalent resistance of the load of the circuitry in device 24. Voltage Vo is the output voltage of rectifier 50 that is being applied to resistance Rload. Current Io is the output current of coil 48.

Coupling coefficient k can be calculated using equations 1 and 2.

$$Vrx = (Io/2 f_{sw} Crx) + Vdiode + Vo \qquad (1)$$

$$k = 2 Vrx (Ltx/Lrx)^{1/2} / (Vctx + Vindc) \qquad (2)$$

In equation 1, fsw is the frequency of the signal applied to transmit coil 42 and Vdiode is the voltage drop associated with the transistors of rectifier 50. The first two terms of equation 1 are small and can be ignored. As a result, Vrx can be taken to be equal to Vo in equation 2. During operation, measurement circuitry 43 (e.g., voltage and current measurement circuitry) in control circuitry 30 of device 24 measures Vo and Io. This allows the value of Io and Vo (and therefore Vrx) to be obtained by device 12 wirelessly over an in-band communications link or other wireless communications link between device 24 and device 12.

In equation 2, Vrx is known from equation 1 and Vctx and Vindc are measured by measurement circuitry in control circuitry 16. The values of Ltx and Lrx can be obtained using measurements made on system 8 (or a representative system) during manufacturing and/or measurements made by system 8 following manufacturing (e.g., when being used in the field by a user). During operation of system 8, wireless power receiving device 24 may convey device type information, inductance measurements such as a measurement of Lrx, and/or other power receiving device characteristics such as rectifier output voltage Vo to device 12 using in-band communications. Using this information and/or information in device 12 (e.g., information stored during manufacturing, and/or measurements made using control circuitry 16), control circuitry 16 can determine k from equation 2.

With one illustrative configuration, system 8 is characterized during manufacturing to determine Ltx/Lrx. This inductance ratio, which may vary depending on the type of device 24 that is being characterized (e.g., the model of cellular telephone, wristwatch, etc.), is stored in device 12 (e.g., in memory in circuitry 16) and is associated with the device type (e.g., a device identifier, etc.) for device 24. Subsequently, device 12 receives device type information (e.g., an ID or other information identifying device 24) wirelessly from device 24 and uses this information to retrieve the appropriate device-type-specific value of Ltx/Lrx from memory in circuitry 16.

With another illustrative configuration, measurement circuitry in control circuitry 16 is used to measure Ltx and measurement circuitry 43 in device 24 is used to measure Lrx. During operation, device 12 wirelessly obtains Lrx from device 24 and uses this information in determine the value of Ltx/Lrx.

The use of the value of k to determine which coils 42 to switch into use during charging operations is more accurate than using other parameters (e.g., measured values of Vo). Consider, as an example, a scenario in which a first of coils 42 is coupled to coil 48 with a first coupling coefficient k1 and results in a voltage Vo1 at the output of rectifier 50 whereas a second of coils 42 is coupled to coil 48 with a second coupling coefficient k2 and results in a voltage Vo2 at the output of rectifier 50. The first coil in this example might be located closer to a ferrite layer at the bottom of device 12 and might therefore have a higher inductance, whereas the second coil might be located farther from the ferrite layer and might therefore have a lower inductance. In this illustrative scenario, the value of Vo1 might be less than Vo2 (e.g., voltage Vo1 may be low due to the larger inductance of the first coil which creates a larger "windings ratio" with coil 48 than the second coil of lower inductance), while k1 is greater than k2 (because the first coil is better coupled to coil 48 than the second coil). The greatest wireless power transfer efficiency in this example, is obtained when using the first coil (the coil with the larger coupling coefficient), rather than using the second coil (the coil producing the larger value of rectifier output voltage Vo2).

The array of coils 42 in device 12 lie in a plane parallel to a charging surface on which device 24 rests. The value of Ltx/Lrx does not vary significantly as device 24 moves around a given one of coils 42 and has an applicable k for charging (e.g., when device 24 is placed at different lateral positions in lateral dimensions X and Y of FIG. 2 such that coupling coefficient k is sufficiently high for charging). The value of Ltx/Lrx will also not vary significantly as a function of changes in the height of device 24 above the charging surface. In some situations, device 24 is not housed in a removable battery case and will rest directly on the charging surface (e.g., height Z=0). In other situations, a user may enclose device 24 in a removable case (e.g., a removable battery case or a removable protective case without a battery). When placed on the charging surface when device 24 is in a removable case, coil 48 may be at a nonzero height (e.g., Z=Z1 relative to its uncased height). As the height of coil 48 above devices 12 increases, Lrx will decrease (because the distance from coil 42 is increasing). The value of Ltx also drops as the height of coil 48 increases above coil 42 (because coil 42 is becoming more distant from coil 48). As a result, the ratio of Ltx/Lrx does not vary significantly with changes in the height of coil 48. This makes the value of Ltx/Lrx independent of factors such as whether a user has placed a removable case on device 24. It can therefore be beneficial to obtain Ltx/Lrx (e.g., measured at height Z=0) during characterizing measurements (e.g., during manufacturing) and to store the measured value of Ltx/Lrx in device 12 (for each type of supported device 24) for later use by device 12 in evaluating equation 2 and accurately determining k. If desired, however, Lrx can be measured by device 24 in the field and Ltx can be measured by device 12 in the field.

Figure 5:
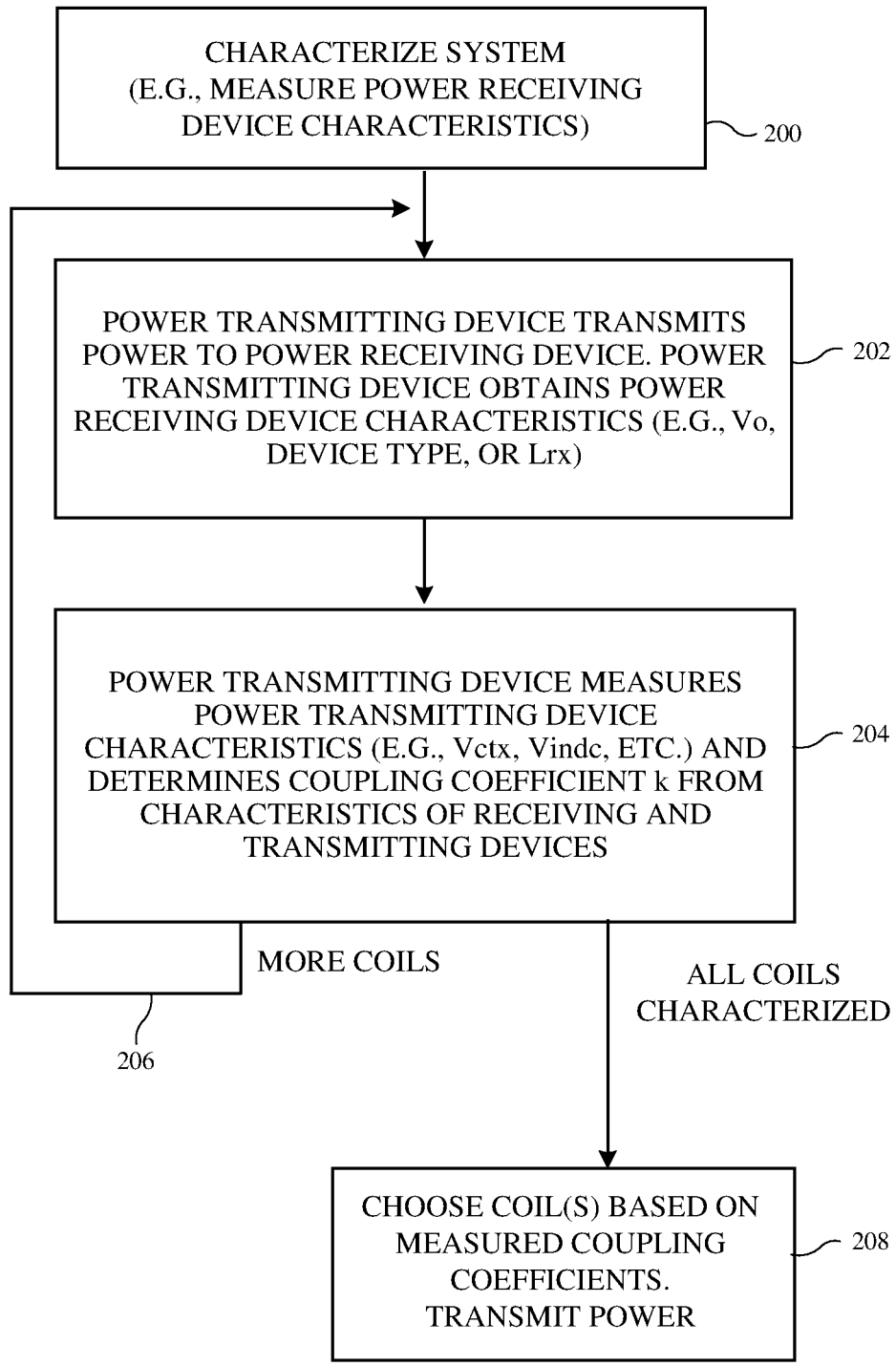
FIG. 5 is a flow chart of illustrative operations involved in calibrating and using wireless power transmitting and receiving devices in accordance with an embodiment.

FIG. 5 is a flow chart of illustrative steps involved in operating system 8.

During the operations of block 200, test equipment may be used to measure Lrx and Ltx in system 8 (or only Lrx in some arrangements). The system in which Lrx and Ltx are measured may be a representative system with a representative (sample) device 12 and representative (sample) device 24. The test equipment may be located in a manufacturing facility. Following measurement of Lrx and Ltx (and determination of Ltx/Lrx), this information and associated device type information that identifies the type of device 24 associated with the stored Ltx/Lrx measurement can be stored in memory in device 12 using the test equipment or associated programming equipment for subsequent retrieval and use by control circuitry 16.

Later, in the field, devices 12 and 24 can operate in accordance with blocks 202, 204, and 208. In particular, during the operations of block 202, device 12 can transmit power to device 24 with one of coils 42. Device 24 can receive the transmitted wireless power signals with coil 48 and can use rectifier 50 to produce output power (voltage Vo) on output terminals 65 (FIG. 3). While receiving power in this way, device 24 can communicate with device 12 using in-band communications (or, if desired, using out-of-band communications).

With one illustrative arrangement, device 24 provides device 12 with device type information (e.g., a device identifier that identifies the type of cellular telephone or other device to be charged) during block 202.

With another illustrative arrangement device 24 measures Lrx and provides Lrx to device 12 during block 202.

Device 24 can also use control circuitry 30 to measure the value of Vo at the output of rectifier 50 and to measure other desired power receiving device characteristics. These power receiving device characteristics (e.g., rectifier output voltage Vo) can also be provided wirelessly to device 12 during block 202.

During the operations of block 204, power transmitting device 12 may measure characteristics of device 12 such as the value of voltage Vctx across capacitor Ctx (e.g., a peak-to-peak voltage measurement), the value of direct-current input voltage Vindc across terminals 63, and other wireless power transmitting device characteristics. The value of Lrx may be obtained from device 24 during block 202 and the value of Ltx may be measured by device 12 or the value of Ltx/Lrx can be retrieved from storage in circuitry 16 based on the device type information received from device 24 during block 202.

Device 12 can then use equations 1 and 2 to determine k for the current coil 42. As indicated by line 206, if all coils 42 of interest have not been measured (e.g., all coils in the array of coils 42 in device 12, all coils in the array of coils 42 in device 12 that are believed to be overlapped by an external object in accordance with results from external object measurement circuit 41, etc.), a different coil 42 can be selected (e.g., by using a different inverter 60 to produce signals 44) and the operations of blocks 202 and 204 can be repeated. If, however, all coils of interest have been characterized, processing can proceed to block 208.

During the operations of block 208, control circuitry 16 of device 12 can analyze the values of k that have been measured and, based on this analysis, select which coil 42 or which set of multiple coils 42 (e.g., which pair of coils 42) to use in transmitting wireless power to device 12.

With one illustrative configuration, the coils 42 that have the highest values of coupling coefficient k are selected and used to transmit power, unless the lower of the two coupling coefficient values is less than a predetermined minimum coupling coefficient threshold value or the ratio of the second highest k to the highest k is less than a predetermined threshold ratio. If either of the coils 42 in the pair of coils with the highest k values has a k value that is less than the threshold or the ratio of the second highest to the highest k value is less than the predetermined threshold ratio, device 12 will select the single coil 42 with the highest k value and will use this single selected coil to transmit wireless power.

Other coil selection criteria based on the measured values of coupling coefficient k can be used, if desired (e.g., selection criteria that result in selection of three or more active coils to transmit power to each wireless power receiving device 12, etc.). As an example, all coils having a coupling coefficient greater than a predetermined threshold may be selected and used in transmitting wireless power, etc. Coils can be selected based on measured k values in scenarios in which there is a single wireless power receiving device on the charging surface of device 12 and when there are more than one wireless power receiving devices present. For example, if there are three devices 24 present on device 12, device 12 can select three sets of coils 42 (each containing one or more coils) to supply wireless power.

The foregoing is merely illustrative and various modifications can be made to the described embodiments. The foregoing embodiments may be implemented individually or in any combination.

What is claimed is:

1. A wireless power transmitting device configured to wirelessly transmit power to a wireless power receiving device having a receive coil, the wireless power transmitting device comprising:
   wireless power transmitting circuitry including a transmit coil characterized by a magnetic coupling coefficient value associated with electromagnetic coupling between the transmit coil and the receive coil; and
   control circuitry configured to:
   transmit, using the wireless power transmitting circuitry, a probe signal to the wireless power receiving device;
   receive, from the wireless power receiving device, a non-zero rectifier output voltage measurement generated in response to the probe signal;
   determine, as a function proportional to the non-zero rectifier output voltage measurement and a transmit-coil-inductance-to-receive-coil-inductance-ratio, the magnetic coupling coefficient value for the transmit coil; and
   transmit, based on the magnetic coupling coefficient value, wireless power to the wireless power receiving device using the transmit coil.

2. The wireless power transmitting device of claim 1, wherein the control circuitry is configured to transmit the wireless power to the wireless power receiving device using the transmit coil in response to the magnetic coupling coefficient value exceeding a threshold value.

3. The wireless power transmitting device of claim 1, wherein the control circuitry is configured to obtain device type information from the wireless power receiving device and is configured to determine the transmit-coil-inductance-to-receive-coil-inductance-ratio based on the device type information.

4. The wireless power transmitting device of claim 3 further comprising a capacitor coupled to the transmit coil that is characterized by a capacitor voltage, wherein the control circuitry is further configured to:
   measure the capacitor voltage; and
   use the measured capacitor voltage in determining the magnetic coupling coefficient value.

5. The wireless power transmitting device of claim 4 wherein:
   the wireless power transmitting circuitry includes inverter circuitry controlled by the control circuitry to provide alternating-current signals to the transmit coil;
   the control circuitry is configured to measure a direct-current input voltage to the inverter circuitry; and
   the control circuitry is configured to use the measured direct-current input voltage in determining the magnetic coupling coefficient value.

6. The wireless power transmitting device of claim 1 wherein the control circuitry is configured to obtain receive coil inductance information from the wireless power receiving device and is configured to determine the transmit-coil-inductance-to-receive-coil-inductance-ratio based on the receive coil inductance information.

7. The wireless power transmitting device of claim 1 wherein the control circuitry is configured to measure a transmit coil inductance for the transmit coil and is configured to use the measured transmit coil inductance in determining the magnetic coupling coefficient value.

8. The wireless power transmitting device of claim 1, wherein the function is proportional to a square root of the transmit-coil-inductance-to-receive-coil-inductance-ratio.

9. The wireless power transmitting device of claim 8, wherein the function is proportional to the non-zero rectifier output voltage measurement multiplied by the square root of the transmit-coil-inductance-to-receive-coil-inductance-ratio.

10. The wireless power transmitting device of claim 1, wherein the transmit-coil-inductance-to-receive-coil-inductance-ratio is directly proportional to an inductance of the transmit coil and wherein the transmit-coil-inductance-to-receive-coil-inductance-ratio is inversely proportional to an inductance of the receive coil.

11. The wireless power transmitting device of claim 10, wherein the function is directly proportional to a square root of the inductance of the transmit coil and is inversely proportional to a square root of the inductance of the receive coil.

12. A wireless power transmitting device configured to wirelessly transmit power to a wireless power receiving device having a receive coil, the wireless power transmitting device comprising:
    wireless power transmitting circuitry including a transmit coil characterized by a coupling coefficient value associated with magnetic coupling between the transmit coil and the receive coil; and
    control circuitry configured to:
        store a plurality of transmit-coil-inductance-to-receive-coil-inductance ratio values corresponding to different device identifiers;
        receive a device identifier from the wireless power receiving device that identifies a device type of the wireless power receiving device;
        identify a transmit-coil-inductance-to-receive-coil-inductance ratio value from the stored plurality of transmit-coil-inductance-to-receive-coil-inductance ratio values that corresponds to the device identifier received from the wireless power receiving device;
        determine the coupling coefficient value as a function of the identified transmit-coil-inductance-to-receive-coil-inductance ratio; and
        transmit, using the transmit coil, wireless power to the wireless power receiving device based on the coupling coefficient value.

13. The wireless power transmitting device of claim 12, wherein the control circuitry is further configured to:
    compare the coupling coefficient value to a threshold value; and
    transmit, using the transmit coil, the wireless power to the wireless power receiving device in response to the coupling coefficient value exceeding the threshold value.

14. The wireless power transmitting device of claim 12, wherein the function is proportional to a rectifier output voltage of the wireless power receiving device.

15. The wireless power transmitting device of claim 14, wherein the function is proportional to the rectifier output voltage of the wireless power receiving device multiplied by a square root of the identified transmit-coil-inductance-to-receive-coil-inductance ratio.

16. The wireless power transmitting device of claim 14, wherein the rectifier output voltage is non-zero.

17. A method of operating a wireless power transmitting device to wirelessly transmit power to a wireless power receiving device having a receive coil, wherein the wireless power transmitting device comprises control circuitry and a transmit coil characterized by a magnetic coupling coefficient associated with electromagnetic coupling between the transmit coil and the receive coil, the method comprising:
    with the transmit coil, transmitting a probe signal to the wireless power receiving device;
    with the control circuitry, receiving a non-zero rectifier output voltage measurement, generated in response to the probe signal, from the wireless power receiving device;
    with the control circuitry, determining a magnetic coupling coefficient value for the transmit coil as a function proportional to the non-zero rectifier output voltage measurement and a transmit-coil-inductance-to-receive-coil-inductance-ratio; and
    with the transmit coil, transmitting wireless power to the wireless power receiving device based on the magnetic coupling coefficient value.

18. The method of claim 17, wherein transmitting the wireless power to the wireless power receiving device based on the magnetic coupling coefficient value comprises:
    comparing the magnetic coupling coefficient value to a threshold value; and
    transmitting the wireless power to the wireless power receiving device in response to determining that the magnetic coupling coefficient value exceeds the threshold value.

19. The method of claim 18, wherein the function is proportional to a square root of the transmit-coil-inductance-to-receive-coil-inductance-ratio.

20. The method of claim 19, wherein the function is proportional to the rectifier output voltage measurement multiplied by the square root of the transmit-coil-inductance-to-receive-coil-inductance-ratio.

* * * * *